United States Patent [19]

Hansen

[11] Patent Number: 5,265,714
[45] Date of Patent: Nov. 30, 1993

[54] CONVEYOR DRIVE MECHANISM HAVING LAMINATED SIDE MEMBERS

[75] Inventor: Kenneth N. Hansen, Waukesha, Wis.

[73] Assignee: Dorner Mfg. Corp., Hartland, Wis.

[21] Appl. No.: 954,489

[22] Filed: Sep. 30, 1992

[51] Int. Cl.$^5$ .................................... B65G 23/00
[52] U.S. Cl. ................................ 198/832; 198/813; 198/860.1
[58] Field of Search .............. 198/813, 816, 832, 835, 198/860.1, 860.2, 861.1

[56] References Cited

U.S. PATENT DOCUMENTS

| | | | |
|---|---|---|---|
| 3,292,772 | 12/1966 | Rice | 198/816 X |
| 3,669,244 | 6/1972 | Pagdin et al. | 198/861.1 X |
| 3,800,938 | 4/1974 | Stone | 198/836.3 X |
| 3,825,108 | 7/1974 | Stone | 198/861.1 |
| 3,878,937 | 4/1975 | Glaser et al. | 198/860.1 X |
| 3,923,148 | 12/1975 | Dorner | 198/570 |
| 4,037,876 | 7/1977 | Georg | 299/43 |
| 4,501,353 | 2/1985 | Burkhardt | 198/779 |
| 4,925,009 | 5/1990 | Hill | 198/860.2 X |
| 4,951,809 | 8/1990 | Boothe | 198/841 |
| 4,993,542 | 2/1991 | Nomura | 198/816 |
| 5,156,260 | 10/1992 | Dorner et al. | 198/835 X |

FOREIGN PATENT DOCUMENTS

| | | | |
|---|---|---|---|
| 3537135 | 4/1987 | Fed. Rep. of Germany . | |
| 2590558 | 5/1987 | France | 198/832 |
| 0001618 | 1/1988 | Japan | 198/861.1 |
| 1-67106 | 6/1989 | Japan . | |
| 2203400 | 10/1988 | United Kingdom | 198/860.1 |

Primary Examiner—Robert P. Olszewski
Assistant Examiner—James R. Bidwell
Attorney, Agent, or Firm—Andrus, Sceales, Starke & Sawall

[57] ABSTRACT

A conveyor drive construction. The conveyor includes a frame and an endless belt conveyor is mounted for travel on the frame. A drive mechanism is operably connected to the lower run of the conveyor belt and includes a pair of side members, each composed of a pair of laminated sheet metal plates. The plates of each pair have aligned openings with the edges bordering the openings in the outer plate being offset from the edges bordering the openings in the inner plate to provide outwardly facing recesses. A plurality of belt carrying spindles extend between the side members and are engaged with the lower run of the belt. The shafts of the spindles are carried by support members, such as bearings, which are mounted in the offset recesses of the side members.

11 Claims, 3 Drawing Sheets

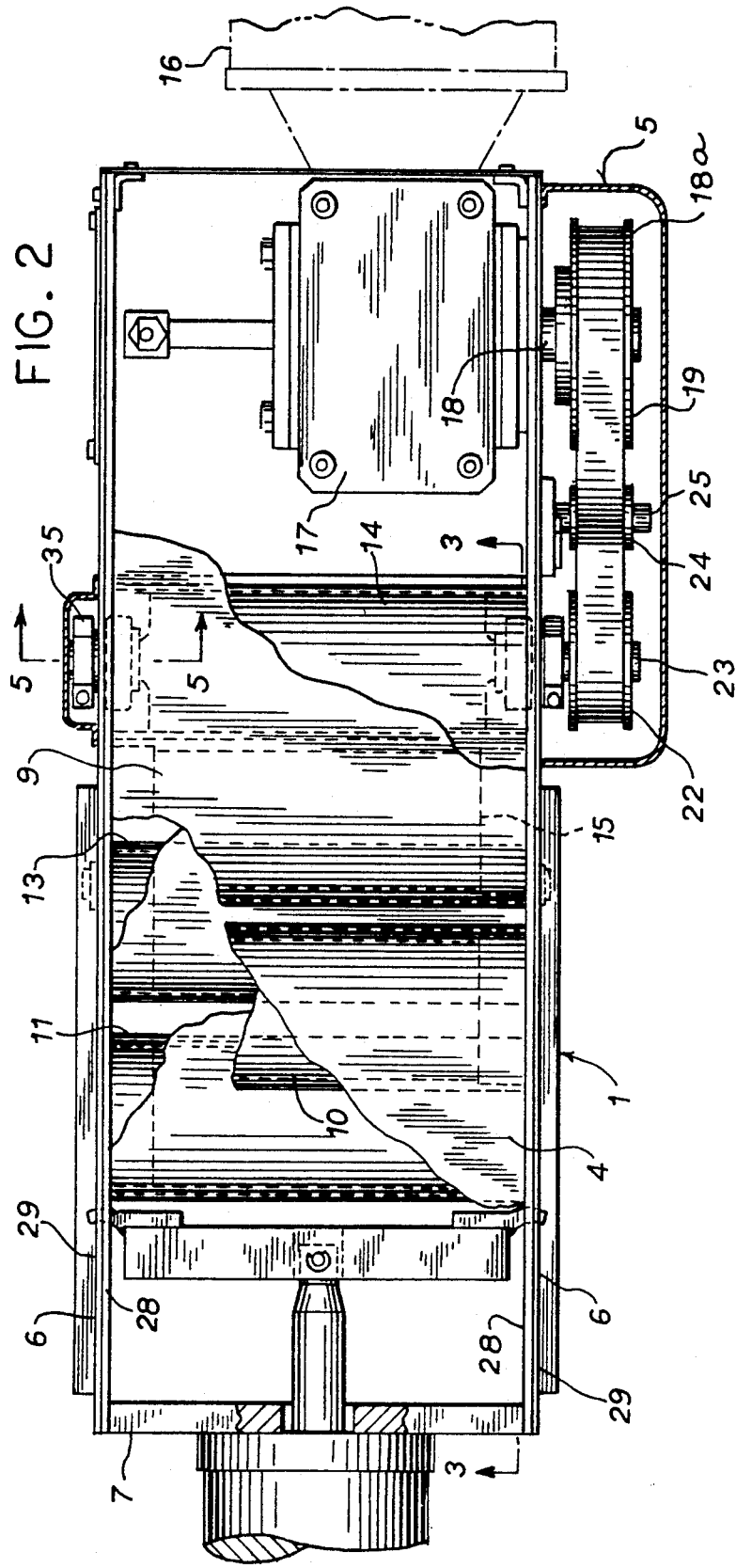
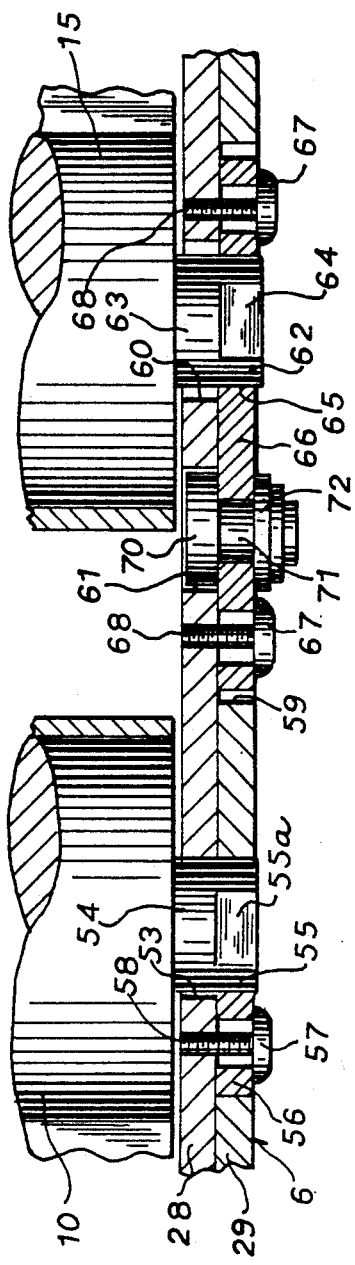
FIG. 2
FIG. 7

CONVEYOR DRIVE MECHANISM HAVING LAMINATED SIDE MEMBERS

BACKGROUND OF THE INVENTION

A common type of drive mechanism for an endless belt conveyor is mounted beneath the conveyor frame and includes a motor that drives a spindle or roller which is engaged with the lower run of the belt. The conventional drive mechanism can also include a movable tensioning spindle over which the belt is trained and by adjustment of the tensioning spindle, the tension on the belt can be controlled.

In a conventional drive mechanism which is mounted beneath a conveyor frame, the motor, the drive spindle, and the tensioning spindle are carried by a pair of side plates which are suspended from the side rails of the conveyor frame. To provide sufficient strength and rigidity, the side plates are normally formed of steel plate having a thickness of about ¼ inch. To mount the motor, as well as the spindles to the side plates, the side plates are formed with a series of openings of various configurations, which are machined in the plates. The side plates are also formed with a substantial number of small holes which are drilled in the side plates for attachment of various components. Because of the extensive machining and drilling operations, the production of the side plates is extremely costly.

SUMMARY OF THE INVENTION

The invention is directed to a drive mechanism for a conveyor and in particular to a drive mechanism which is suspended beneath the conveyor frame and incorporates a novel laminated side member. More specifically, the drive unit includes a pair of side members which are suspended from the side rails of the conveyor frame, and each side member is a laminated structure formed of a pair of plates which are disposed in flatwise relation. The plates of each pair are provided with aligned openings and the edges bordering the openings in the outer plate of each pair are offset from the edges bordering the openings in the inner plate to provide outwardly facing offsets or recesses.

A plurality of belt supporting spindles that are engaged with the lower run of the conveyor belt extend between the side members, and the shafts of the spindles are carried by support members which are mounted in the offset recesses of the side members.

In a preferred form of the invention, the drive unit includes a pair of drive spindles which are engaged with and drive the conveyor belt and the shafts of the drive spindles are journaled in bearing assemblies which are mounted in the offset recesses in the side members. The preferred embodiment also includes a pair of tensioning spindles and the shafts of the tensioning spindles are mounted in slide plates which are guided for movement in the offset recesses in the side members.

The plates to be used in fabricating the side members are preferably metal stampings and the openings to receive the bearing assemblies or other shaft supporting members for the spindles, as well as the small mounting holes for attaching auxiliary components, can be formed by stamping operations, thus eliminating the costly machining and drilling operations that have been used in the past when dealing with relatively heavy side plates.

With the invention, the plates can be reversed to either side of the drive unit, so that only two plate configurations are required for the side members.

The use of the laminated construction also eliminates the possibility of distortion which can occur during heavy machining operations. The stamping operation may also tend to distort the individual plates, but by securing or laminating two plates together, either by welding, adhesives or mechanical fasteners, the lamination will compensate for distortion, so that the resulting laminated structure is substantially free of distortion.

Other objects and advantages will appear in the course of the following description.

DESCRIPTION OF THE DRAWINGS

The drawings illustrate the best mode presently contemplated of carrying out the invention.

In the drawings:

FIG. 2 is a top plan view of the construction shown in FIG. 1 with parts broken away in section;

FIG. 7 is a section taken along line 7—7 of FIG. 1.

DESCRIPTION OF THE ILLUSTRATED EMBODIMENT

Figure 1:
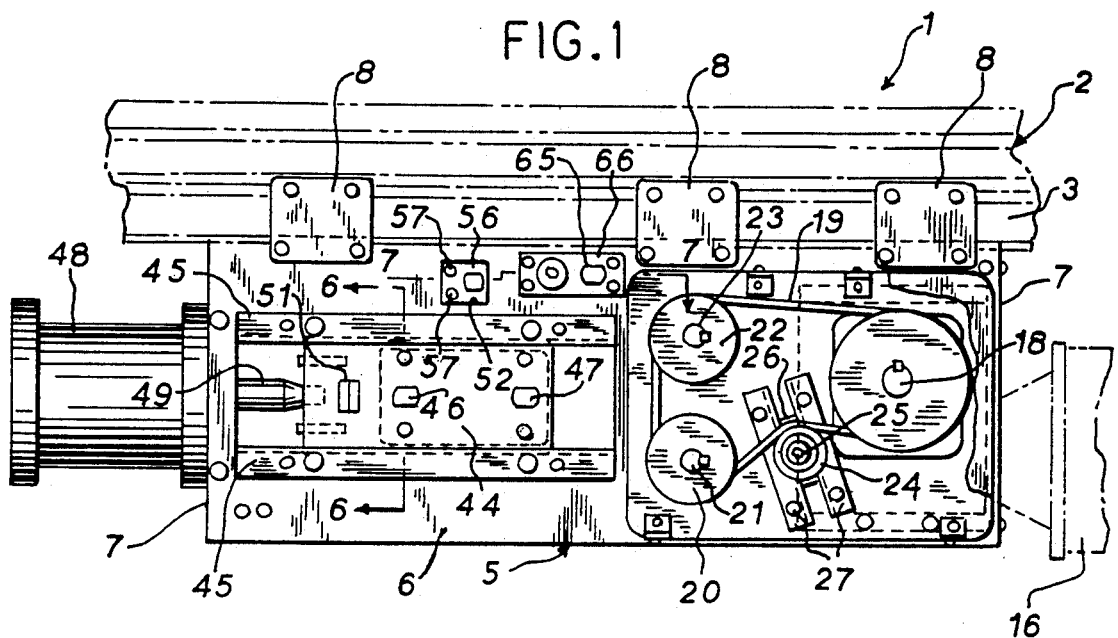
FIG. 1 is a fragmentary side elevation of an endless belt conveyor incorporating the drive mechanism of the invention.

The drawings illustrate a typical endless belt conveyor 1, including a structural frame 2 that has a pair of parallel longitudinal side rails 3. An endless conveyor belt 4 is mounted for movement on the conveyor frame 2 and is adapted to convey articles on the upper run of the belt. The construction of the frame and side rails can be constructed as shown in the copending U.S. Pat. No. 5,156,260.

Belt 4 is trained over a pair of spindles or pulleys, not shown, which are located at the ends of the conveyor, and a drive unit 5 is operably connected to the lower run of the belt and operates to drive the belt in its endless path of travel.

Drive unit 5 includes a pair of parallel vertical side members 6, the ends of which are connected together by end members 7. Side members 6 are suspended from the side rails 3 of the conveyor frame 2 by brackets 8.

Figure 3:
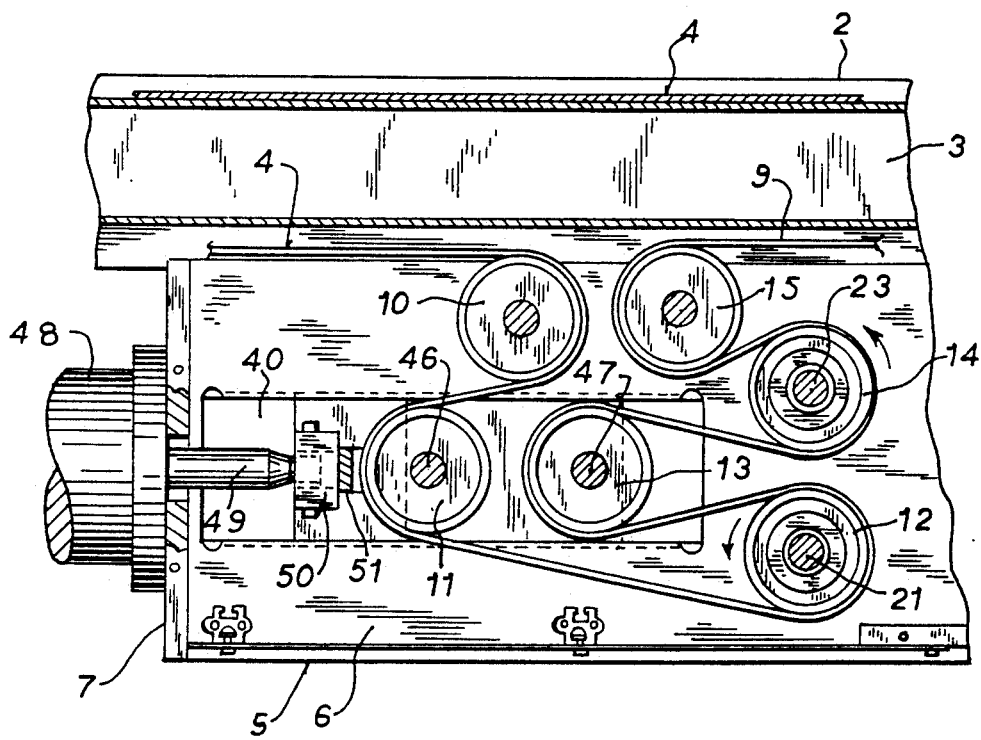
FIG. 3 is a section taken along line 3—3 of FIG. 2.

Drive unit 5 includes a series of spindles or rollers which are engaged with the return run 9 of belt 4. As seen in FIG. 3, belt 4 passes over an idler spindle 10, then downwardly around a first tensioning spindle 11, then over a first drive spindle 12, then rearwardly around a second tensioning spindle 13, then around a second drive spindle 14 and then back and around idler spindle 15. Spindles 101–5 are carried by side members 6 of the drive unit in a manner as hereinafter described.

Drive spindles 12 and 14 are driven from a power source, such as a hydraulic or electric motor 16, which extends outwardly from one of the end members 7 and is operably connected to a gear reducing unit 17 that is mounted to the inner surface of one of the side members 6.

As best shown in FIGS. 1 and 2, the output shaft 18 of gear reducing unit 17 carries a pulley 18a, which is connected through a timing belt 19 to a pulley 20 on the shaft 21 of drive spindle 12. Belt 19 is also engaged with a second pulley 22 mounted on the end of shaft 23 of drive spindle 14. With this drive mechanism, operation of motor 16 will drive both of the drive spindles 12 and 14 in the directions as shown in FIG. 3, to thereby drive the conveyor belt 4 in its endless path of travel. The use of the dual drive spindles increases the area of surface contact with belt 4, thereby increasing the driving force.

To tension the belt 19, an adjustable tensioning pulley or roller 24 is also engaged with belt 19. As shown in FIGS. 1 and 2, pulley 24 is journaled on a shaft 25 and the inner end of the shaft is threaded to a generally rectangular slide block or nut 26 which is slidable between the guide bars 27. The tensioning roller 24 can be locked in position by threading down shaft 25 in nut 26, drawing the nut outwardly against the guide bars 27.

In accordance with the invention, the side members 6 are a laminated structure, each consisting of an inner plate 28 and an outer plate 29, which are disposed in flatwise relation. Plates 28 and 29 are preferably sheet metal stampings.

Figure 4:
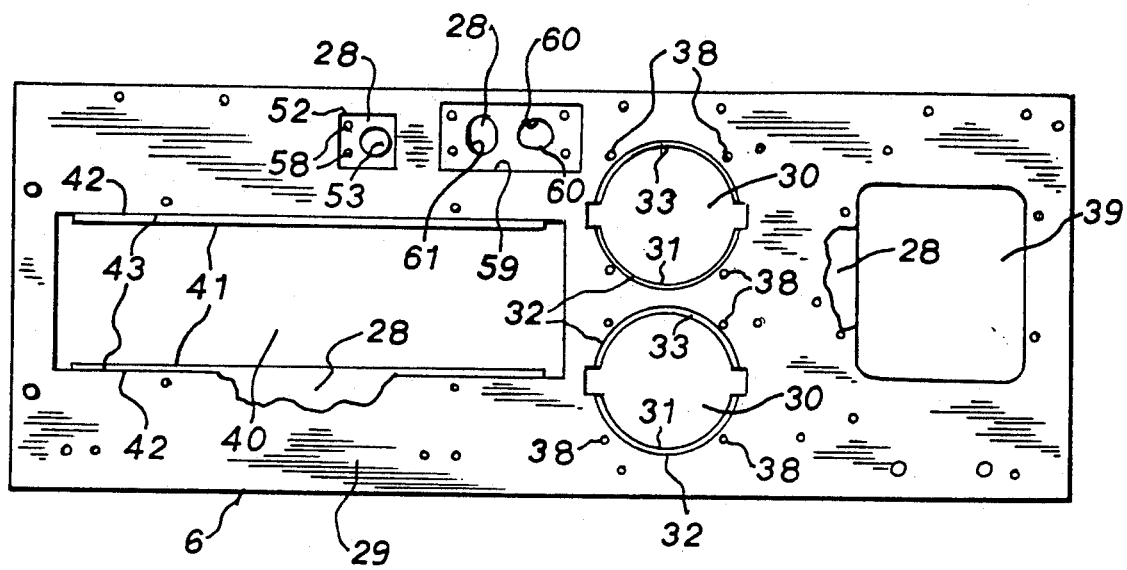
FIG. 4 is a plan view, with parts broken away, of the laminated side member of the drive unit before the attachment of component parts.

FIG. 4 shows the laminated side member consisting of the superimposed plates 28 and 29. The two plates can be secured together by welding, adhesives, rivets, or other mechanical fasteners to provide the laminated structure. As best shown in FIG. 4, plates 28 and 29 are provided with two pair of aligned openings 30, and the generally circular edge 31 of the inner plate 28 bordering the opening 30 projects inwardly from the generally circular edge 32 of the outer plate 29, which borders the corresponding aligned opening, thus providing an offset, outwardly facing recess 33 bordering each opening 30.

Figure 5:
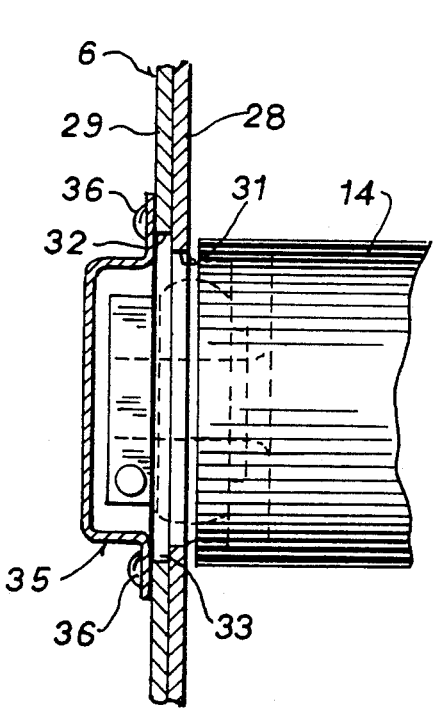
FIG. 5 is a section taken along line 5—5 of FIG. 2.

As best shown in FIG. 5, bearing assemblies 35 which journal the ends of the drive spindles 12 and 14 are mounted in the outwardly facing recesses 33 that border the openings 30. The bearing assemblies are secured in the recesses 33 by screws 36 which extend through openings in the flanges of the bearing assemblies and are threaded in the holes 38 in inner plates 28. The engagement of the peripheral edges of the bearing assemblies 35 with the recesses 33 prevents inward movement of the bearing assemblies relative to the side members 6, as well as preventing lateral displacement.

As seen in FIG. 4, laminated plates 28 and 29 are also formed with aligned generally square openings 39, and in this case the edges of the plates bordering the openings 39 are also in alignment. The openings 39 in one of the side members 6 receives the output shaft 18 of gear reducing unit 17.

Figure 6:
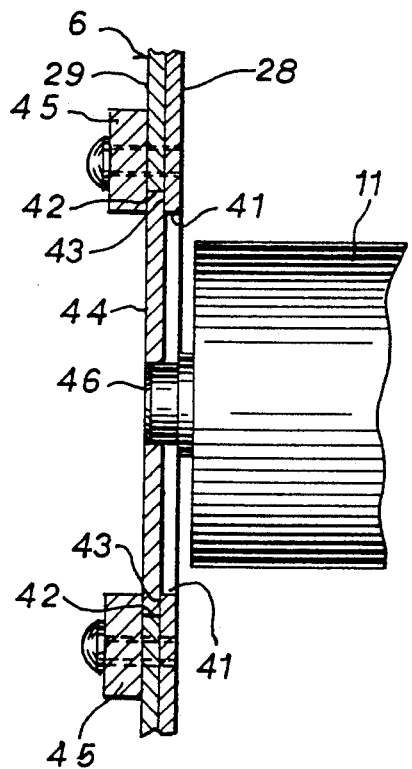
FIG. 6 is a section taken along line 6—6 of FIG. 1.

Plates 28 and 29 are also formed with aligned generally rectangular openings 40, which are adapted to receive the tensioning spindles 11 and 13. The upper and lower edges 41 of inner plate 28 bordering opening 40 project beyond the corresponding edges 42 of the outer plate 29 to form a pair of parallel offset recesses 43, as best seen in FIG. 6. A vertical slide plate 44 is mounted for sliding movement in the recesses 43, and guide bars 45 are secured by screws to the plates 28 and 29, enclosing the outer sides of the recesses 43 and forming guide slots to receive the upper and lower edges of slide plate 44.

The outer ends of shafts 46 and 47 that carry spindles 11 and 13, respectively, have a non-circular configuration and are received within mating holes of similar configuration in slide plates 44, thereby preventing rotation of shafts 46 and 47 relative to the slide plates. Tensioning spindles 11 and 13 are journaled on shafts 46 and 47, respectively, by internal bearings located within the ends of the spindles.

Slide plate 44, which carries the tensioning spindles 11 and 13, is adapted to be moved horizontally to adjust the tension on the belt by a cylinder unit 48, which is mounted to one of the end members 7 of the drive unit. The piston rod 49 of cylinder unit 48 is connected to yoke 50 and extensions 51 on the yoke project through openings in the slide plates 44. With this construction operation of cylinder unit 48 will move the slide 44 horizontally to correspondingly shift tensioning spindles 11 and 13 and thereby adjust the tension on belt 4.

As seen in FIG. 4, the outer plate 29 of each side member is also formed with a generally square opening 52, while the inner plate 28 is provided with an aligned cylindrical hole 53. A cylindrical portion 54 of the shaft 55 of idler spindle 10 is received within hole 53, as shown in FIG. 7, while the end of the shaft, located outwardly of the cylindrical section 54, is non-circular in cross section having a pair of flats 55a, and is received within an opening of complementary shape in a keeper plate 56. Keeper plate 56, as seen in FIGS. 1 and 7, is mounted within the opening 52 in outer plate 29 by screws 57 which are threaded in holes 58 in inner plate 28.

Also seen in FIG. 4, the outer plate 29 of each side member is formed with a rectangular opening 59, while the inner plate 28 has a pair of openings 60 and 61 which are aligned with the rectangular opening 59 is the outer plate. The shaft 62 of idler roller 15 is provided with an inner cylindrical section 63 which is received within the opening 60 in the inner plate 28. In addition, the outer portion of the shaft 62, located outwardly of cylindrical section 63 is non-cylindrical, as indicated by 64 and is received within a complementary hole 65 in a keeper plate 66, which is mounted within the rectangular opening 59 in outer plate 29. Keeper plate 66 is secured within the opening 59 by screws 67 which are threaded in holes 68 in inner plate 28.

The idler spindles 10 and 15 are journaled on shafts 55 and 62 by internal bearings, and the engagement of the non-cylindrical outer ends 55 and 62 by internal bearings, and the engagement of the non-cyclindrial outer ends 55a and 64 of the shafts with the complimentary holes in the keeper plates, prevents rotation of the shafts.

As best illustrated in FIG. 7, a cam or eccentric 70 is located within opening 61 in inner plate 28. The shaft 71 of cam 70 extends outwardly through an opening in keeper plate 66 and the outer end of the shaft carries a washer 72 and snap ring which locks the cam in position. Located in the outer end of shaft 71 is a non-circular hole, such as a hex-shaped hole, not shown, which is adapted to receive a tool in order to rotate cam 70.

As cam 70 is rotated, the peripheral cam surface will engage the edge of inner plate 28 bordering opening 61. As inner plate 28 is fixed, the rotation of the cam will cause the keeper plate 66 to slide relative to inner plate 28. As shaft 62 of idler spindle 15 is connected to plate 66, movement of plate 66 will cause corresponding movement of shaft 62 and spindle 15. This skewing action will act to track the belt. The enlarged hole 60 permits the spindle shaft 62 and spindle 15 to move relative to inner plate 28. After the belt is properly tracked, plate 66 can be locked to inner plate 28 by lock screws 67.

The plates 28 and 29 are preferably sheet metal stampings, and the openings to receive the various components are formed by stamping or punching operations. Thus, the expensive machining and drilling operations, as used in the past when dealing with metal side plates of substantial thickness, is eliminated.

As a further advantage, the plates 28 and 29 are reversible, so that only two plate configurations are required for both of the side members 6.

The plates can be secured together either by spot welding, adhesive, rivets, or other mechanical fasteners. By laminating the two plates, any distortion that may have occurred during the stamping operation is substantially eliminated, so that the resulting laminated side members are substantially free of distortion and within desired tolerances.

Various modes of carrying out the invention are contemplated as being within the scope of the following claims particularly pointing out and distinctly claiming the subject matter which is regarded as the invention.

I claim:

1. A conveyor drive construction, comprising a frame, a conveyor mounted for movement on the frame, a drive unit operably connected to the conveyor for driving the conveyor, said drive unit including a pair of side members mounted on the frame, at least one of said side members composed of a pair of plates disposed in flatwise relation, said plates having aligned openings, the opening in the first of said plates being of a different configuration than the aligned opening in the second plate, whereby an edge bordering the opening in the first plate projects beyond a corresponding edge bordering the opening in the second plate to provide an offset recess between said edges, a spindle extending between said side members to support said conveyor in movement and having a shaft, and shaft support means for supporting said shaft and disposed in said recess.

2. The construction of claim 1, wherein said conveyor is an endless belt conveyor.

3. The construction of claim 2, wherein said spindle comprises a drive spindle for driving the belt.

4. The construction of claim 2, wherein said spindle comprises a belt tensioning spindle mounted for movement relative to said side members.

5. The construction of claim 1 wherein each support member includes an outer plate and an inner plate, an edge of said inner plate bordering said opening projects inwardly of the edge of the outer plate bordering said opening.

6. A conveyor drive construction, comprising a supporting frame, a belt conveyor mounted for endless movement on the frame and having a conveying run and a return run, a drive unit mounted beneath the frame and operably connected to said return run, said drive unit including a pair of side members connected to said frame, each side member composed of a pair of laminated plates disposed in flatwise relation, each pair of plates comprising an inner plate and an outer plate and having aligned openings, an edge bordering the opening in said inner plate projecting beyond an edge bordering the opening in said outer plate to provide an outwardly facing recess between said edges, said drive unit also including a spindle engaged with said belt and extending between said side members, said spindle having a shaft, and shaft supporting means for supporting the ends of said shaft and disposed in the recesses in the respective side members.

7. The construction of claim 6, wherein said shaft supporting means comprises bearing means for journaling said shaft.

8. The construction of claim 6, wherein said shaft supporting means comprises a slide plate mounted for sliding movement in said recess.

9. The construction of claim 8, wherein said spindle comprises a belt tensioning spindle.

10. The construction of claim 6, wherein the aligned openings are generally circular and said recess extends around a substantial portion of the periphery of said aligned openings.

11. The construction of claim 6, wherein the opening in each inner plate is cylindrical and the corresponding shaft end has a cylindrical section disposed in said cylindrical opening, and said shaft supporting means comprises a keeper plate disposed in each recess, each keeper plate having a non-circular aperture and the corresponding shaft end having a non-cylindrical section disposed axially outward of the cylindrical section and disposed in registry with the non-circular aperture in said keeper plate.

* * * * *